March 7, 1933.    C. S. BRAGG ET AL    1,900,155
BRAKE MECHANISM
Original Filed Feb. 1, 1929
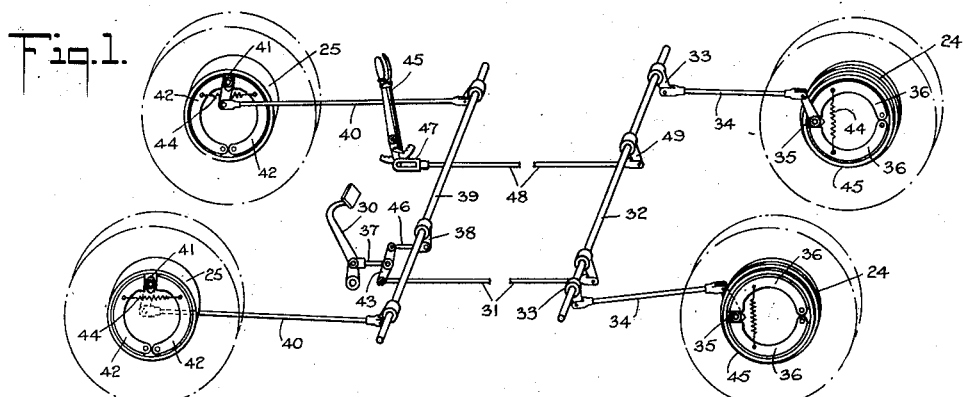
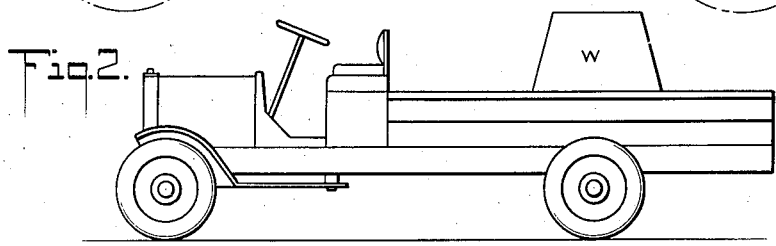
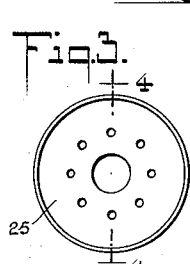 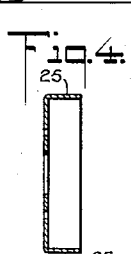 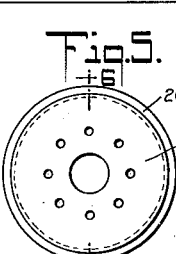 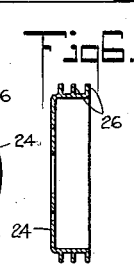 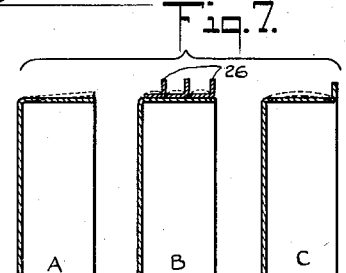
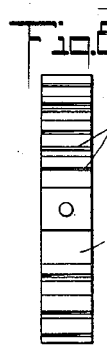 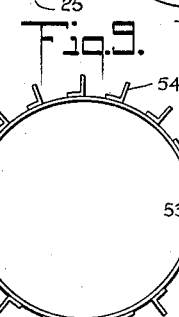 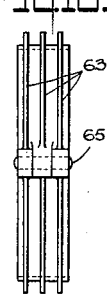 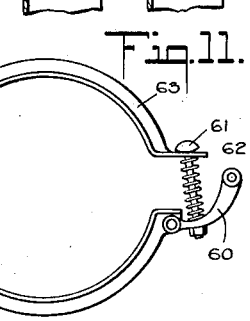
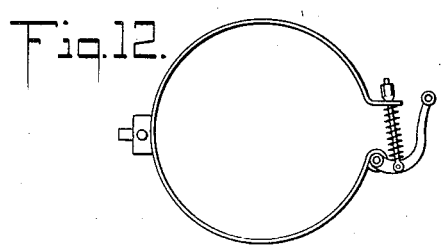
INVENTOR
CALEB S. BRAGG and
VICTOR W. KLIESRATH
BY
ATTORNEY Patented Mar. 7, 1933								1,900,155

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM

Original application filed February 1, 1929, Serial No. 336,720. Divided and this application filed December 30, 1929. Serial No. 417,296.

This invention relates to vehicle brake mechanism, and more particularly to such mechanism for use with automotive vehicles, and is a division of application Ser. No. 336,720.

Aside from wind resistance, the only external force acting on a moving vehicle, such as an automobile, is the reaction between the tires of the vehicle and the roadway over which it is travelling and this force acts at the point of contact of the tires and roadway. When it is desired to slow down a moving automobile a force must be exerted at this point of contact in a direction opposite to the direction of motion of the vehicle. This force is usually called the force of friction, it is limited by the characteristics and condition of the roadway and tires, and is proportional to the force pressing the tires onto the roadway or in other words the load on the wheels.

A loaded rotating tire presses into the interstices and irregularities of the road surface and we might say "gears" itself to the road, whereas, a sliding tire (due to a "locked" wheel) slides over the roadway with a smaller adhesive effect. It follows that with a given load the maximum force of friction between the tires and the roadway exists, during continuous and progressive application of the brakes, just before the rotating wheels are "locked" or "skidded" and that there is a decrease in the force of friction as soon as the wheels are so locked. There are other reasons why it is undesirable to lock or skid the wheels. It causes undue wear on the tires, it interferes with the steering of the vehicle when it occurs to the front wheels, and it causes "skidding" or sluing of the vehicle from its course when it occurs to the rear wheels.

In order to produce the maximum braking effect this maximum force of friction which is produced just before the wheels "lock" and slide should be fully utilized. But, care must be exercised to prevent the brakes from "locking" the wheels with the undesirable results enumerated above.

When a vehicle is in motion it has stored within itself certain amount of energy due to its motion. This is usually called kinetic energy and is equal to the amount of work required to put the vehicle in motion (neglecting friction losses). This energy is proportional to the mass or weight of the vehicle and the square of its velocity. In other words an automobile travelling at sixty miles per hour has four times as much energy of motion stored up within it as the same automobile travelling at thirty miles per hour and nine times as much as the same automobile travelling at only twenty miles per hour.

The brakes on a vehicle must convert all this kinetic energy into heat energy in order to bring the vehicle to rest. Therefore when a car travelling at sixty miles per hour is brought to rest the brakes will generate nine times as much heat as when the same car is brought to rest from twenty miles per hour in the same distance because the energy whether kinetic or heat varies as the square of the velocity.

The usual automobile brake consists of a cylindrical brake drum, which should be made as light as possible to reduce the unsprung weight of the vehicle, adapted to be attached to the spokes or hub portion of the wheel to rotate therewith, and a non-rotating member supported by the axle and adapted to frictionally engage the drum. This non-rotating member is usually lined on the friction side with a fibre material (asbestos) and may be placed around the drum in the form of a band adapted to be contracted so as to engage the drum or it may be placed inside the drum and adapted to be forced outwardly into contact with the drum. The former type is known as an external or contracting brake and the latter type as an internal or expanding brake.

The heat generated by the frictional engagement of the complemental friction elements of the brake has a twofold effect upon these brake elements. First, it heats up the fibre brake lining and thus decreases its holding effect because this lining has a lower coefficient of friction when hot than when cold. Second, it heats up the brake drums so that they expand and in so doing distort and thus decrease the effective area of contact between the drum and the fibre lining of the brake shoe or brake band.

It is an object of this invention to dissipate the heat more rapidly from the brakes at one end of the vehicle than from the brakes at the other end so as to vary the efficiency of the brakes at either end of the vehicle and thus compensate for changes in load on the front and rear axles of the vehicle due to transfer of weight or material variations in load carried by the vehicle.

How the foregoing together with such other objects and advantages as may hereinafter appear or are incident to my invention are realized, is illustrated in preferred form in the accompanying drawing, wherein:

Fig. 1 is a diagrammatic representation of a mechanical brake mechanism shown on a commercial automobile or motor truck and provided with an equalizer for maintaining predetermined braking forces at the ends of the brake cam levers.

Fig. 2 is a side view of a commercial automobile or motor truck.

Fig. 3 is a side elevation of a brake drum such as those to be used on the end of the vehicle requiring a relative reduction in braking effort as the rear brake mechanism of a pleasure car or the front brake mechanism of a truck.

Fig. 4 is a section taken through line 4—4 of Fig. 3.

Fig. 5 is a side elevation of a brake drum to be used on the end of a vehicle requiring relatively increased braking effect as the front brakes of a pleasure car or the rear brakes of a motor truck.

Fig. 6 is a section taken through line 6—6 of Fig. 5.

Fig. 7A shows a section through a brake drum such as that shown in Figs. 3 and 4, and in dotted lines shows its distortion when heated.

Fig. 7B shows a section through a brake drum such as that shown in Figs. 5 and 6, and in dotted lines shows its distortion when heated.

Fig. 7C shows a section through a brake drum equipped with an outer reinforcing lip, and in dotted lines shows its distortion when heated.

Fig. 8 is an end view of an external brake band equipped with radiating ribs.

Fig. 9 is a side view of the brake band shown in Fig. 8.

Fig. 10 is an end view of a hinged external contracting brake shoe equipped with radiating flanges.

Fig. 11 is a side view of the brake shoe of Fig. 10.

Fig. 12 is a figure illustrating an external contracting brake equipped without radiating flanges or ribs.

Referring to Fig. 1 we have illustrated diagrammatically a mechanical brake mechanism with an equalizing means between the front and rear wheel brake mechanisms and in this instance adapted to be applied to a motor truck. We have seen fit to show and describe that type of brake shoe operating means known as a mechanical linkage system wherein the brake pedal is connected to the brake shoe operating means by a series of links, cross shafts and pivoted arms. This type of brake mechanism forms no part of the present invention and we do not limit ourselves to it but describe it briefly in order to more clearly explain the scope of our present invention.

A brake pedal, 30, adapted to operate brakes on all wheels of the vehicle is pivoted to a stationary part thereof and positioned to be conveniently actuated by the operator. It is connected by a link, 37, to the mid-point of equalizer bar, 43. One end of the equalizer bar, 43, is connected by link, 31, to the rear wheel brake operating shaft, 32, which is adapted to rotate in suitable bearings mounted on the frame. Arms, 33, on shaft, 32, connect said shaft to links, 34, which in turn are connected to the usual operating mechanism for brake shoe cams, 35, which are adapted to force apart the free ends of the brake shoes, 36, and thus force the brake shoes into contact with the brake drums.

Through link 46, the other end of equalizer bar, 43, is connected to arm, 38, mounted on cross shaft, 39, which is adapted to rotate in suitable bearings attached to the frame members. The motion of the shaft, 39, is communicated to the front brake shoe operating cams, 41, by link, 40, in a manner well known to the art. As on the rear wheel, brakes cams, 41, are adapted to force apart the free ends of brake shoes, 42, so as to bring the brake shoes into frictional engagement with the brake drums. Each pair of brake shoes is equipped with the usual retracting spring, 44, to draw the shoes away from the drum upon release of the brake pedal. An extra retracting spring (not shown) may be attached to the brake operating pedal in order to return it to its at-rest position.

The usual emergency brake or parking brake lever is illustrated at 45 and it is connected to brake operating cross shaft, 32, by means of link, 48, with slotted connection 47, and pivoted arm, 49.

For reasons to be explained hereafter we equip the rear wheels of the motor truck illustrated in Fig. 2 with ribbed brake drums, 24, (Figs. 5, 6 and 7B) which have already been described in detail and we equip the front wheels with plain brake drums, 25, (Figs. 3, 4 and 7A) which have also been described.

In Figs. 8, 9, 10 and 11 we have illustrated different types of radiating friction elements adapted for external brakes.

External contracting brake shoes are of two types. One, a flexible band adapted to wrap around the outside of the brake drum and to be contracted into frictional engagement therewith by suitable linkage. This type is illustrated in Figs. 8 and 9 where 50 represents a flexible steel strap or band movably supported at 55 in the usual manner to allow a small movement toward and away from the drum as the brake is applied and then released. The band actuating means may comprise an arm, 51, pivoted to one end of the band and a bolt, 52, pivoted to the other end and to arm, 51. A retracting spring, 53, may be used to release the band upon release of the brake linkage. In this type of brake it is essential that the band maintain its flexibility so we have secured our radiating ribs, 54, transversely of the circumferential dimension of the band. When so placed they do not interfere with the flexibility of the band. These ribs may be attached by riveting or in any other manner which will produce a close union between the rib and band.

In Figs. 10 and 11 we have illustrated another type of external contracting brake wherein the contracting member is made of two semi-circular shoes pivoted at one end and connected to suitable actuating linkage at the other such as arm 60, bolt, 61 and spring, 62, which is adapted to contract the brake shoes around a rotatable drum in a manner well known to the art. These shoes are usually cast or forged into the desired shape and have substantially no inherent flexibility but depend upon their pivoted co-ordination to contract and expand sufficiently to arrest and release the brake drum. Radiating ribs may be attached to these brake shoe members along circumferential lines as illustrated at 63, Figs. 10 and 11. These ribs may be cast or forged with the brake shoe during its manufacture or may be attached thereto by riveting or other suitable means.

In Figs. 12 we have illustrated an external or contracting band brake which is well known to the art and is similar to that shown in Figs. 8 and 9 and described above, except that it is not equipped with radiating or reinforcing ribs 54. In the use of external brakes this brake would be used on the wheels which are subject to the lesser load, for instance in a truck or commercial vehicle the front wheels which carry only a small part of the weight of the contents of the truck. If a motor truck is so equipped on the front wheels these brakes may be combined with either internal or external radiating type brakes on the rear wheels.

When the brakes are applied heat is generated at the cylindrical portion of the brake drums proportionate to the degree of deceleration and they expand and distort if this heat is not quickly dissipated. The cylindrical portion of the plain type of drum illustrated in Figs. 3, 4 and 7A will distort when heated as shown in dotted lines in Fig. 7A so that the outer portion thereof will move out of contact with the internal or expanding type of brake shoe or will force a portion of the external or contracting brake band out of contact and thus decrease the area of contact between the brake shoes and drum and decrease the total braking area and the braking effect on that rotating wheel.

That type of drum illustrated in Fig. 7C will distort by bulging out in the middle of the transverse cylindrical portion as shown by the dotted lines. This results because the flat disc like portion of the drum tends to hold one edge of the transverse cylindrical portion in shape while the reinforcing lip tends to hold the other edge in shape both of these disc portions serving also to radiate heat from the adjoining cylindrical portion. Because of this bulge the brake shoe and brake drum will contact only near the edge portions of the drum after the distortion thereof by heat and thus the total braking effort is decreased on the wheel equipped with this type of drum.

The equalizing means permits a relative movement of all brake applying parts. The co-efficient of friction between the brake shoe lining and the rotating drum is decreased by the increase of heat and this, plus the reduction of the effective area tends to decrease the braking effect of a brake which is allowed to heat up and offset increased pressures on the reduced braking areas.

In an internal expanding type of brake the outwardly directed pressure of the brake shoes amounting to as high as 100 to 120 pounds per square inch tends to further distort the drum in the same direction as the heat tends to distort it so that this mechanical force acts as an aid or auxiliary to the forces due to heat expansion.

On the other hand if the brake drum is equipped with radiating and reinforcing ribs, 26, as illustrated in Figs. 5, 6 and 7B, the heat generated by the complemental friction elements of the brake when in contact is dissipated rapidly enough by the radiating ribs or fins so that the temperature of the drum does not increase to a degree where it causes a material distortion. The ribs also serve to mechanically hold the drum in its true shape against the action of the brake shoes which are pressing outwardly.

If such a drum is heated in a furnace for instance it will distort by bulging between the ribs as shown in the dotted lines of Fig. 7B which are exaggerated for purposes of illustration but even this result will allow a greater area of contact between the shoe and drum than is present with drums of the kind shown in Figs. 7A or 7C. In practice the drum equipped with radiating ribs will not heat up sufficiently to cause material distortion due to the fact that the ribs tend to dissipate the heat and also to mechanically strengthen the drum against any force which tends to distort it.

In a commercial vehicle or motor truck brake areas are preferably chosen so as to give satisfactory braking effects when the truck is fully loaded. The result is that these brakes are so large that they will decelerate an empty truck without heating sufficiently to cause material distortion or change in the co-efficient of friction between the brake lining and brake drum. The presence of ribs on one set of brake drums will not materially affect the normal or predetermined efficiency of the various brake mechanisms of an empty truck. Such a truck carries at least one-half of its load on the front wheels (and may carry more) and one-half on the rear wheels so that equally effective brake mechanism on both front and rear axles are desirable when the vehicle is lightly loaded.

When this truck is loaded up to capacity the load often equals the weight of the vehicle and if so is positioned so that most of it falls on the rear wheels only (see Fig. 2). Under these conditions it is obvious that it is desirable to increase the efficiency of the rear wheel brakes relative to the front wheel brakes in order to utilize the increase of available friction existing between the rear wheels and the roadway. We accomplish this by equipping the rear wheel brakes only with radiating and reinforcing ribs which tend to increase the efficiency of these brakes by maintaining a comparatively low temperature for the brake lining and drum so as to maintain a high co-efficient of friction between the lining and drum and prevent distortion of the drum due to heat expansion. The temperature of the brakes will be higher on a loaded than on an empty truck for the heat to be absorbed by the brakes is proportional to the weight of the truck and load and therefore the uncooled drums on the front wheels heat up and distort under severe braking efforts while the rear drums will maintain their efficiency and thus the rear will be made relatively more effective when the truck is loaded.

In an external contracting brake as shown in Figs. 8, 9, 10 and 11 the radiating ribs serve the same purpose as the ribs placed on the drum of an internal expanding brake. They keep the brake lining and the drum cool with the same desirable results as were enumerated and explained above in regard to the internal expanding brake.

We have seen fit to illustrate and describe our invention as embodied in four wheel vehicles but we contemplate its use in any automotive vehicle which is supported at or near the front thereof and at or near the rear thereof by wheels regardless of the number of wheels with which the vehicle is equipped.

I claim:—

In an automotive vehicle, front brakes and rear brakes, said brakes adapted to be operated by a common means providing a predetermined distribution of brake operating forces to each brake, said front brakes being so constructed that parts thereof deform when heated during the operation of the brakes to thereby reduce the braking efficiency of said front brakes, and said rear brakes being so constructed that parts thereof resist deformation during the braking operation to thereby automatically increase the braking efficiency of said rear wheel brakes.

In testimony whereof we have signed this specification this 26 day of December, 1929.

CALEB S. BRAGG.
VICTOR W. KLIESRATH.